United States Patent
Watanabe et al.

(10) Patent No.: US 7,699,921 B2
(45) Date of Patent: Apr. 20, 2010

(54) INK COMPOSITION FOR INK JET PRINTER

(75) Inventors: Kazuaki Watanabe, Nagano-ken (JP); Shinichi Kato, Nagano-ken (JP); Bunji Ishimoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/143,080

(22) Filed: Jun. 20, 2008

(65) Prior Publication Data
US 2008/0255298 A1    Oct. 16, 2008

Related U.S. Application Data

(63) Continuation of application No. 10/001,256, filed on Nov. 2, 2001, now Pat. No. 7,405,245.

(30) Foreign Application Priority Data

Nov. 2, 2000 (JP) .......................... P.2000-335969
Apr. 17, 2001 (JP) .......................... P.2001-118095

(51) Int. Cl.
*C09D 11/00* (2006.01)
*C09D 11/02* (2006.01)
*C09D 11/10* (2006.01)
*C09D 5/02* (2006.01)
*C08J 3/03* (2006.01)

(52) U.S. Cl. .................. 106/31.6; 106/31.13; 523/161; 524/501; 524/509; 524/521; 524/522

(58) Field of Classification Search ................. 523/161; 106/31.13, 31.6; 524/501, 522, 521, 509
See application file for complete search history.

(56) References Cited

U.S. PATENT DOCUMENTS

| | | |
|---|---|---|
| 5,702,510 A | 12/1997 | Yoshida et al. |
| 5,760,124 A | 6/1998 | Listigovers et al. |
| 5,769,930 A | 6/1998 | Sano et al. |
| 5,900,899 A | 5/1999 | Ichizawa et al. |
| 5,912,280 A | 6/1999 | Anton et al. |
| 5,977,207 A | 11/1999 | Yui et al. |
| 5,990,202 A | 11/1999 | Nguyen et al. |
| 6,368,397 B1 | 4/2002 | Ichizawa et al. |
| 6,378,999 B1 | 4/2002 | Doi et al. |
| 6,454,846 B2 | 9/2002 | Yatake |
| 6,790,878 B2 | 9/2004 | Kurabayashi |
| 6,916,862 B2 | 7/2005 | Ota et al. |
| 6,924,327 B2 | 8/2005 | Sano et al. |
| 7,101,921 B2 | 9/2006 | Edwards et al. |

FOREIGN PATENT DOCUMENTS

| | | |
|---|---|---|
| JP | 2590790 | 12/1996 |
| JP | 11-115302 | 4/1999 |
| JP | 11-217525 | 8/1999 |

OTHER PUBLICATIONS

Derwent Abstract of JP 1999-502487 dated Aug. 10, 1999.
Patent Abstract of Japan and JPO computer English translation of JP 11-217525 dated Aug. 10, 1999.
Patent Abstract of Japan and JPO computer English translation of JP 11-115302 dated Apr. 27, 1999.

*Primary Examiner*—Sanza L McClendon
(74) *Attorney, Agent, or Firm*—Ladas and Parry LLP

(57) ABSTRACT

An aqueous ink composition comprising at least water, a pigment dispersed by polymer, a sulfonyl group-containing (co)polymer, and an ultra-penetrating agent. Also disclosed are a recording process using the ink composition, an ink cartridge containing the ink composition, and a recorded article having an image recorded by the recorded method.

5 Claims, No Drawings

INK COMPOSITION FOR INK JET PRINTER

This application is a continuation of application Ser. No 10/001,256 filed on Nov. 2, 2001, now U.S. Pat. No. 7,405,245 claims the benefit thereof and incorporates the same by reference.

FIELD OF THE INVENTION

The present invention relates to an aqueous ink composition which, without impairing ejection stability, is excellent in light-fastness and water-fastness, does not cause cohesion differential, gloss differential, bronzing phenomenon, color-bleeding, and the like, has improved fixing ability and coloring property, and is capable of performing highly glossy recording. Particularly, an aqueous ink composition suitable for ink jet printing, a recording process using the aqueous ink composition, a recorded article having an image recorded by the recording process, and an ink cartridge containing the aqueous ink composition.

BACKGROUND OF THE INVENTION

An aqueous ink composition generally contains water as a main component, to which a coloring component, and a wetting agent such as glycerin are incorporated. Moreover, recording media to be used for the aqueous ink composition include those capable of absorbing the ink composition to some extent and of being penetrated by a colorant, for example, paper. As a recording process using an aqueous ink composition, an ink jet recording process has recently attracted an attention. Ink let recording process is a recording process in which droplets of an ink composition are ejected through fins nozzles and deposited onto a recording medium to conduct recording.

Hitherto, a water-soluble dye has been frequently employed as a colorant for an aqueous ink composition to be used in an ink; jet printing method, so that there exists a defect that the light-fastness and water-fastness of a recorded image are poor. On the other hand, it has been examined to employ a pigment as a colorant for improving the light-fastness and water-fastness of a recorded image, but there arises a problem that fixing ability onto a recording medium is insufficient in the case of employing a pigment as a colorant.

In addition, the present inventors found the following problems. Color-bleeding may occur because the penetration rate of an ink composition is slow depending on recording media. Therefore, it has been examined to incorporate an acetylene glycol-type or glycol other-type penetrating agent. However, even in the case of an ink composition wherein the penetrating ability of the ink is enhanced by the use of the above-described penetrating agent, the penetrating ability is still insufficient depending on recording media, and thus there sometimes occurs a phenomenon that color density becomes uneven (hereinafter, referred to as "cohesion differential"). Accordingly, there is a problem that ejecting amount of the ink composition cannot be increased and thus coloring property cannot be improved, especially in the case that recording, is conducted by overlapping two or more colors.

Furthermore, in the case of conventional ink compositions, the inventors have found problems of occurrence of a phenomenon that difference in reflectance is observed depending on print duties (hereinafter, referred to as "gloss differential") and occurrence of a phenomenon that a solid print of cyan looks reddish (hereinafter, referred to as "bronzing"). In addition, it is sometimes difficult to realize image recording of a sufficiently high gloss.

SUMMARY OF THE INVENTION

The present invention has been made to solve the above-described problems.

Accordingly, it is an object of the present invention to provide an aqueous ink composition excellent in light fastness and water-fastness, which does not cause cohesion differential, gloss differential, bronzing, color-bleeding, and the like without impairing ejection stability, and has improved fixing ability and coloring property.

Another object of the invention is to provide an aqueous ink composition further being capable of performing highly glossy image recording in addition to the above-described properties.

A still other object of the invention is to provide a recording process using the aqueous ink composition.

A still other object of the invention is to provide a recorded article having an image recorded by the recording process.

A still other object of the invention is to provide an ink cartridge containing the aqueous ink composition.

Other objects and effects of the present invention will become apparent from the following description.

The above-described objects of the invention have been achieved by providing an aqueous ink composition comprising at least water, a pigment dispersed by polymer, a sulfonyl group-containing (co)polymer, and an ultra-penetrating agent.

In a preferred embodiment, the sulfonyl group-containing (co)polymer is present in the form of an emulsion.

In another preferred embodiment, the sulfonyl group-containing (co)polymer is at least one of a diene-based, sulfonyl group-containing (co)polymer and a non-diene-based, sulfonyl group-containing (co)polymer.

In a still other preferred embodiment, the non-diene-based, sulfonyl group-containing (co)polymer is an acryl-based, sulfonyl group-containing (co)polymer.

In a still other preferred embodiment, the pigment dispersed by polymer is a pigment dispersed in an aqueous medium by an acrylic (co)polymer having an acid value of 100 or more.

In a still other preferred embodiment, the ultra-penetrating agent is at least one compound selected from the group consisting of acetylene glycol compounds, acetylene alcohol compounds, and glycol ether compounds.

In a still other preferred embodiment, the ultra-penetrating agent is a combination of a compound represented by the following formula (1) and triethylene glycol monobutyl ether:

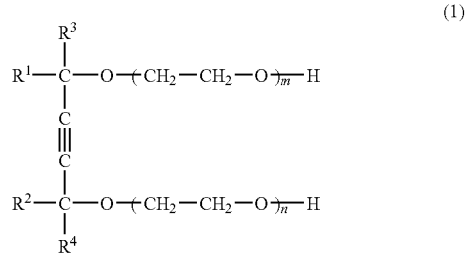

wherein, $0 \leq m+n \leq 50$, and $R^1$, $R^2$, $R^3$ and $R^4$ each independently is an alkyl group.

In a still other preferred embodiment, the aqueous ink composition is for use in ink jet recording.

The present invention also provides a recording process comprising recording an image by an ink jet recording process using any one of the above-described aqueous ink compositions.

The present invention also provides an ink cartridge containing any one of the above-described aqueous ink compositions.

The present invention also provides a recorded article having an image recorded by the recording process.

DETAILED DESCRIPTION OF THE INVENTION

The aqueous ink composition of the invention is described in detail below.

The aqueous ink composition of the invention is obtainable by mixing at least water, a "pigment dispersed by polymer", a "sulfonyl group-containing (co)polymer", and an "ultra-penetrating agent".

In the invention, the "aqueous ink composition" means, for monochromatic recording, an aqueous black ink composition, and, for color recording, an aqueous color ink composition, specifically an aqueous cyan ink composition, an aqueous magenta ink composition, an aqueous yellow ink composition, or also in some cases, an aqueous black ink composition.

In the invention, the "pigment dispersed by polymer" means a pigment which is dispersed in an aqueous medium (water or a mixture of water and a water-soluble organic solvent) by the action of a polymeric dispersant (described later) or a polymeric dispersant and other dispersant.

In the invention, the "sulfonyl group-containing (co)polymer" means a sulfonyl group-containing polymer (described later) and/or a sulfonyl group-containing copolymer (described later).

As the pigment to be contained in the aqueous ink composition of the invention as a colorant, there may be employed an inorganic, pigment and an organic pigment which have hitherto been employed in ink composition for ink jet recording. Examples of the inorganic pigment usable include carbon blacks produced by known methods such as contact process, furnace process, and thermal process, in addition to titanium oxide and iron oxide. Moreover, examples of the organic pigment usable include azo pigments (including azo lakes, insoluble azo pigments, condensed azo pigments, chelate azo pigments, for example), polycyclic pigments (for example, phthalocyanine pigments, perylene pigments, perinone pigments, anthraquinone pigments, quinacridone pigments, dioxazine pigments, thioindigo pigments, isoindolinone pigments, and quinophthalone pigments), nitro pigments, nitroso pigments, and aniline black.

The colorant for the cyan ink composition is preferably a cyan pigment.

As the cyan pigment, C. I. Pigment Blue 15:3, 15:4, 60, and the like are preferably employed, and particularly preferred is C. I. Pigment Blue 15:3.

Moreover, the colorant for the magenta ink composition is preferably a magenta pigment.

As the magenta pigments, C. I. Pigment Red 122, 202, 209, C. I. Pigment Violet 19, and the like are preferably employed, and particularly preferred is C. I. Pigment Red 122.

These cyan pigments and magenta pigments may be used solely or as a mixture of two or more.

Moreover, a yellow pigment and a black pigment are preferably used as colorants for the yellow ink composition and black ink composition, respectively.

The yellow pigment includes C. I. Pigment Yellow 13, 74, 93, 109, 110, 128, 138, 150, 151, 154, 155, 180, 185, and the like, and the black pigment includes carbon black and the like.

Furthermore, as pigments to be used for color ink compositions other than cyan, magenta, or yellow ink composition, e.g., orange ink composition and green ink composition, there may be mentioned C. I. Pigment Orange 36, 43, or the like and C. I. Pigment Green 7, 36,or the like.

The particle, diameter of the pigment to be contained in the aqueous ink composition is preferably 10 μm or less, more preferably 0.1 μm or less.

Moreover, the content of the pigment in the aqueous ink composition is not particularly limited but is preferably from 0.1 to 20% by weight, more preferably from 0.2 to 10% by weight.

The pigment is used as a dispersion in an aqueous medium (water or a mixture of water and a water-soluble organic solvent) dispersed by the action of a polymeric dispersant or the action of a polymeric dispersant and other dispersant, i.e., as a "pigment dispersed by polymer".

As a preferable example of the polymeric dispersant, a natural polymer may be mentioned. Specific examples thereof include proteins such as glue, gelatin, and albumin; natural rubbers such as gum arabic and gum tragacanth; glycosides such as saponin; alginic acid and alginic acid derivatives such as alginate ester of propylene glycol, triethanolamine alginate, and ammonium alginate; cellulose derivatives such as methyl cellulose, carboxymethyl cellulose, hydroxyethyl cellulose, and ethyl hydroxycellulose; and the like.

A synthetic polymer may be also mentioned as a preferable example of the polymeric dispersant. Specific examples thereof include polyvinyl alcohols; polyvinyl pyrrolidones; (meth)acrylic resins such as polyacrylic acid, polymethacrylic acid, polycrotonic acid, acrylic acid-acrylonitrile copolymer, potassium acrylate-acrylonitrile copolymer, vinyl acetate-acrylic ester copolymers, and acrylic acid-alkyl acrylate copolymers; styrene-(meth)acrylic resins such as styrene-acrylic acid copolymer, styrene-methacrylic acid copolymer, α-methylstyrene-acrylic acid copolymer, α-methylstyrene methacrylic acid copolymer, styrene-methacrylic acid-alkyl acrylate copolymers, styrene-α-methylstyrene-acrylic acid copolymer, and styrene-α-methylstyrene-acrylic acid alkyl acrylate copolymers; styrene-maleic acid copolymer; styrene-maleic anhydride copolymer; vinylnaphthalene-acrylic acid copolymer; vinylnaphthalene-maleic acid copolymer; vinyl acetate copolymers such as vinyl acetate-ethylene copolymer, vinyl acetate-fatty acid vinyl ethylene copolymer, vinyl acetate-maleic ester copolymer, vinyl acetate-crotonic acid copolymer, and vinyl acetate-acrylic acid copolymer; and salts thereof.

Among them, preferred is a copolymer obtainable from a monomer having a hydrophobic group and a monomer having a hydrophilic group or a polymer obtainable from a monomer having both of a hydrophobic group and a hydrophilic group in the molecular structure.

Moreover, in view of the realization of highly glossy image recording, particularly preferred is an unsaturated fatty acid polymer or a copolymer of at least one unsaturated fatty acid and at least one hydrophobic monomer having an acid value of 100 or more. Examples of the polymer and copolymer include unsaturated fatty acid polymers such as polyacrylic acid, polymethacrylic acid, and polycrotonic acid; styrene-(meth)acrylic copolymers such as styrene-acrylic acid copolymer, styrene-methacrylic acid copolymer, α-methylstyrene-acrylic acid copolymer, α-methylstyrene-methacrylic acid copolymer, and styrene methacrylic acid-alkyl acrylate copolymers; styrene-crotonic acid copolymers; styrene-maleic acid copolymers; and salts thereof.

Examples of the above-noted salts include salts with diethylamine, ammonia, ethylamine, triethylamine, propylamine, isopropylamine, dipropylamine, butylamine, isobutylamine, triethanolamine, diethanolamine, aminomethylpropanol, and morpholine.

The "acid value" means an amount (mg) of KOH. necessary for neutralizing 1 g of the above polymer or copolymer.

These copolymers have a weight average molecular weight of preferably 3,000 to 30,000, more preferably 5,000 to 15,000.

The addition amount of the polymeric dispersant is preferably in the range of 0.05 to 3, more preferably 0.1 to 3 in terms of the weight ratio relative to the weight of the pigment.

As other dispersant which can be used in combination upon the preparation of the pigment dispersed by polymer, a conventional water-soluble ionic or nonionic surfactant may be mentioned.

Examples of anionic surfactants include higher fatty acid salts, higher alkyl dicarboxylate salts, higher alcohol sulfate ester salts, higher alkylsulfonate salts, condensates of higher fatty acids and amino acids, sulfosuccinate ester salts, naphthenate salts, liquid fatty oil sulfate ester salts, alkylarylsulfonate salts, and the like.

Examples of cationic surfactants include aliphatic amine salts, quaternary ammonium salts, sulfonium salts, and phosphonium salts, and examples of amphoteric surfactants include polyacrylamide.

Examples of the nonionic surfactants include fatty acid esters of polyoxy compounds, and polyethylene oxide condensates.

One or more of the above-described "other dispersants" may be used in combination with the polymeric dispersant.

The total addition amount of the polymeric dispersant and the above-described "other dispersants" is preferably in the range of 0.06 to 3, more preferably 0.125 to 3 in terms of the weight ratio relative to the weight of the pigment.

The pigment dispersed by polymer to be used in the invention can be prepared by stirring and mixing, for example, a pigment, a polymeric dispersant or a polymeric dispersant and other dispersant, and an aqueous medium by means of, for example, beads mill, ball mill, sand mill, attritor, roll mill, agitator, Henschell mixer, colloid mill, ultrasonic homogenizer, or pearl mill.

The sulfonyl group-containing (co)polymer to be contained in the aqueous ink composition of the invention is obtained by sulfonating a polymer or copolymer obtainable by polymerization or copolymerization of the monomer(s) described below (see JP A-11-217525 (The term "JP-A" as used herein means an "unexamined published Japanese patent application")), or is obtained by polymerizing or copolymerizing sulfonated monomer(s), and includes a diene-based, sulfonyl group-containing (co)polymer which requires a diene monomer as the essential component, and a non-diene-based, sulfonyl group-containing (co)polymer which does not requires a diene monomer as the essential component.

In the aqueous ink composition of the invention, the sulfonyl group-containing (co)polymer is preferably used in the form of an emulsion. The use of the composition employing a pigment dispersed by polymer as the pigment and containing an emulsion of a sulfonyl group-containing (co)polymer enables the improvement of fixing ability without impairing ejection stability. Furthermore, the use of the composition also enables the suppression of occurrence of cohesion differential, gloss differential, and bronzing and enables the increase of print duty, which is resulted from the combined use of an ultra-penetrating agent, whereby the enhancement of coloring property becomes possible.

The monomers employed for obtaining the diene based, sulfonyl group-containing (co)polymer include diene monomers and other monomers usable in combination with the diene monomers.

The diene monomers are diene compounds having 4 to 10 carbon atoms, and examples thereof include 1,3-butadiene, 1,2-butadiene, 1,3-pentadiene, 1,2-pentadiene, 2,3-pentadiene, isoprene, 1,2-hexadiene, 1,3-hexadiene, 1,4-hexadiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene, and cycloheptadiene. These diene monomers may be used solely or in combination of two or more.

Examples of other monomers usable in combination with the diene monomers include aromatic monomers such as styrene, α-methylstyrene, o-methylstyrene, p-methylstyrene, m-methylstyrene, and vinylnaphthalene; alkyl (meth)acrylates such as methyl (meth)acrylate, ethyl (meth)acrylate, and butyl (meth)acrylate; mono or dicarboxylic acids such as (meth)acrylic acid, crotonic acid, maleic acid, and itaconic acid or anyhydrides of dicarboxylic acids; vinylcyan compounds such as (meth)acrylonitrile; unsaturated compounds such as vinyl chloride, vinylidene chloride, vinyl methyl ketone, vinyl acetate, (meth)acrylamide, and glycidyl (meth) acrylate. These other monomers may be used solely or in combination of two or more.

In the case of combined use of these other monomers, the proportion of the diene monomer to be employed is preferably 0.5% by weight or more, more preferably 1% by weight or more, further preferably 5% by weight or more based on the total weight of the whole monomers.

The diene-based (co)polymer obtainable by polymerizing or copolymerizing the above diene monomer(s) and optionally other monomer(s) usable in combination with the diene monomer(s) may be any (co)polymer including a random copolymer and a block copolymer. Examples of preferred (co)polymer include isoprene homopolymer, butadiene homopolymer, isoprene-styrene random copolymer, isoprene-styrene block copolymer, styrene-isoprene styrene triblock copolymer, butadiene-styrene random copolymer, butadiene-styrene block copolymer, styrene-butadiene-styrene block copolymer, styrene-butadiene-styrene triblock copolymer, and ethylene-propylene-diene triblock copolymer. Examples of more preferred copolymer include isoprene-styrene block copolymer, styrene-isoprene-styrene triblock copolymer, butadiene-styrene block copolymer, styrene-butadiene-styrene block copolymer, and styrene-butadiene-styrene triblock copolymer.

The diene-based, sulfonyl group-containing (co)polymer to be used in the invention is sulfonated, for example, by hydrogenating some part or all of the remaining double bonds of the above diene-based (co)polymer and/or of the precursor monomers and by sulfonating the resulting (co)polymer in accordance with a known sulfonating method, for example, the methods described in Shin-Jikken Kaqaku Koza (Vol. 14, III. p. 1773 edit, by the Chemical Society of Japan) or JP-A-2-227403.

The above hydrogenation may be conducted after the sulfonation.

Examples of a sulfonating agent include sulfuric anhydride, sulfuric acid, chlorosulfonic acid, fuming sulfuric acid, and hydrogen sulfites (Li salt, Na salt, K salt, Rb salt, Cs salt, or the like).

The amount of the sulfonating agent is preferably from 0.005 to 1.5 mol, more preferably from 0.01 to 1.0 mol relative to 1 mol of the above (co)polymer.

The diene-based, sulfonyl group-containing (co)polymer of the invention is obtained by treating the sulfonated product as obtained above with water and/or a basic compound. Examples of the basic compound include alkali metal hydroxides, alkali metal alkoxides, alkali metal carbonates, ammonia water, organometallic compounds, and amines. The basic compound may be used solely or in combination of two or more. The amount of the basic compound to be used is 2 mol or less, preferably 1.3 mol or less, relative to 1 mol of the sulfonating agent used.

The diene-based, sulfonyl group-containing (co)polymer thus obtained is preferably used in the form of an emulsion in water. The emulsion is obtained by stirring and mixing the product after neutralization or before neutralization (a solution of the sulfonated product in an organic solvent) with water and/or a basic compound to emulsify the product, and then removing the organic solvent while maintaining the water.

The content of the diene-based, sulfonyl group-containing (co)polymer is preferably from 0.1 to 20% by weight, more preferably from 0.2 to 10% by weight in an aqueous ink composition. When the content is less than 0.1% by weight, there exists a problem that sufficient friction resistance cannot be attained in some cases, while when the content is more than 20% by weight, there arise problems that the viscosity of the ink composition may exceeds the viscosity most suitable fur ink head and that ejection stability may be deteriorated.

Examples of the monomer used for obtaining the non-diene-based, sulfonyl group-containing (co)polymer include vinyl monomers such as allylsulfonic acid, vinylsulfonic acid, or methacrylsulfonic acid obtainable by reacting isobutyleene and sulfur trioxide; styrene monomers such as sodium p-styrenesulfonate (e.g., Spiromer manufactured by Tosoh Corporation); or monomers having sulfonyl group such as a methacrylate ester monomer represented by the general formula: $CH_2=C(CH_3)\text{-}COO(AO)_n SO_3 Na$ (A: a lower alkylene group)

(e.g., Eleminol RS-30, manufactured by Sanyo Kasei K.K.); and sodium salts, potassium salts, and lithium salts of the above monomers.

The non-diene-based, sulfonyl group-containing (co)polymer may be a copolymer obtained by copolymerizing the above sulfonyl group-containing monomer and a monomer containing no sulfonyl group. Examples of other copolymerizable monomer include aromatic monovinyl compounds such as styrene, ethylvinylbenzene, α-methylstyrene, fluorostyrene, and vinylpyrene; acrylate ester monomers such as butyl acrylate, 2-ethylhexyl acrylate, β-methacryloyloxyethyl hydrogen phthalate, and N,N'-dimethylaminoethyl acrylate; methacrylate ester monomers such as 2-ethylhexyl methacrylate, methoxy diethylene glycol methacrylate, methoxy polyethylene glycol methacrylate, methyl methacrylate, ethyl methacrylate, butyl methacrylate, N,N'-dimethylaminoethyl methacrylate, and glycidyl methacrylate; cyanated vinyl compounds such as acrylonitrile and methacrylonitrile; silicon-modified monomers; and macromonomers.

Furthermore, there may be mentioned conjugated double bond compounds such as butadiene and isoprene; vinyl ester compounds such as vinyl acetate; and α-olefin compounds such as 4-methyl-1-pentene. Among the copolymerizable monomers, preferred are styrene, methyl methacrylate, and acrylonitrile.

The amount of the copolymerizable monomer to be used is usually from 1 to 93% by weight, preferably from 5 to 80% by weight based on the total weight of the whole polymerizable monomers.

The non-diene-based, sulfonyl group-containing (co)polymer is obtained by radical polymerization of the above sulfonyl group-containing monomer or the sulfonyl group-containing monomer and other copolymerizable monomer in a solvent for polymerization such as water or an organic solvent using a radical polymerization initiator or a chain transfer agent.

Examples of the organic solvent for polymerization to be used for radical polymerization include alcohols such as methanol, ethanol, and isopropanol; aromatic hydrocarbons such as xylene, toluene, and benzene; aliphatic hydrocarbons such as butane, pentane, hexane, cyclohexane, and heptane. Among the solvent for polymerization, preferred is water or methanol.

Examples of the radical polymerization initiator include persulfate-type initiators such as potassium peroxide, sodium persulfate, and ammonium persulfate; inorganic initiators such as hydrogen peroxide; organic peroxides such as cumene hydroperoxide, isopropylbenzene hydroperoxide, p-menthane hydroperoxide, benzoyl peroxide; and organic initiators represented by azo-type initiators such as azobisisobutyronitrile.

The non-diene-based, sulfonyl group-containing (co)polymer obtainable by polymerizing or copolymerizing the above non-diene-based, sulfonyl group-containing monomer(s) may be any (co)polymer including a random copolymer and a block copolymer.

The non-diene-based, sulfonyl group containing (co)polymer to be used in the invention is preferably used as an emulsion in water. The emulsion is obtained by stirring and mixing the product after neutralization or the product before neutralization (a solution of the sulfonated product in an organic solvent) with water and/or a basic compound to emulsify the product, and then removing the organic solvent while maintaining the water.

The content of the non-diene-based, sulfonyl group-containing (co)polymer is preferably from 0.1 to 20% by weight, wore preferably from 0.2 to 10% by weight in an aqueous ink composition. When the content is less than 0.1% by weight, there exists a problem that sufficient friction resistance cannot be attained in some cases, while when the content is more than 20% by weight, there arise problems that the viscosity of the ink composition may exceeds the viscosity most suitable for ink head and that ejection stability may be deteriorated.

As the ultra-penetrating agent to be contained in the aqueous ink composition of the invention, there may be mentioned acetylene glycols, acetylene alcohols, and glycol ethers.

They can be, of course, used in combination and, for example, it is also possible to use acetylene glycols and/or acetylene alcohols in combination with glycol ethers.

Specific examples of the acetylene glycols include acetylene glycol surfactants such as 2,4,7,9-tetramethyl-5-decyn-4,7-diol and 3,6-dimethyl-4-octyn-3,6-diol, e.g., Surfynol 104 (compound of the above formula (1) wherein m+n=10), Surfynol 82, Surfynol 465, Surfynol 485, or Surfynol TG (compound of the above formula (1) wherein m=n=0) manufactured by Air Products and Chemicals Inc. In particular, satisfactory record quality can be attained with the use of Surfynol 104 or Surfynol TG.

Specific examples of the acetylene alcohols include 3,5-dimethyl-1-hexyn-3-ol and 2,4-dimethyl-5-hexyn 3-ol.

The content of the acetylene glycol and/or acetylene alcohol is preferably from 0.05 to 5% by weight, more preferably from 0.1 to 2% by weight in an aqueous ink composition. When the content is less than 0.05% by weight, there exists a problem that sufficient penetrating ability cannot be attained in some cases, while when the content exceeds 5% by weight, there arises a problem that ejection stability may be deteriorated owing to the incomplete dissolution in the ink composition.

Examples of the glycol ethers include lower alkyl ethers of polyhydric glycols ouch as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, and triethylene glycol monobutyl ether. In particular, a satisfactory record quality can be attained with the use of triethylene glycol monobutyl ether.

The content of the glycol ether is preferably from 0.5 to 20% by weight, more preferably from 1 to 10% by weight in an aqueous ink composition. When the content is less than 0.5% by weight, there exists a problem that sufficient penetrating ability cannot be attained in some cases, while when the content exceeds 20% by weight, there arise problems that the viscosity of the ink composition may become very high to decrease the stability of the aqueous ink composition.

The aqueous ink composition of the invention contains the following various components as aqueous media. The aqueous medium of the invention is water or a mixture of water and a water-soluble organic solvent.

The water-soluble organic solvent may include organic solvents having a low boiling point (particularly, alcohols having low boiling points). Examples of the low boiling point alcohols include aliphatic alcohols having 1 to 4 carbon atoms such as methyl alcohol, ethyl alcohol, n-propyl alcohol, isopropyl alcohol, n-butyl alcohol, sec-butyl alcohol, tert-butyl alcohol, and isobutyl alcohol. These low boiling point organic solvents may be used solely or in combination of two or more.

The content of the low boiling point organic solvents (particularly, low boiling point alcohols) is preferably from 1 to 30% by weight, more preferably 10 to 20% by weight. When the content exceeds 30% by weight, a problem of ejecting property may arise, while when the content is less than 1% by weight, the rate of drying may decrease.

The aqueous ink composition of the invention may contain other additives, for example, a pH regulator, an antiseptic agent, and/or an antifungal agent. Examples of the pH regulator include various amines such as diethanolamine and triethanolamine, and alkali metal hydroxides such as sodium hydroxide, potassium hydroxide, and lithium hydroxide.

Moreover, the aqueous ink composition of the invention has a surface tension at 20° C. of preferably 20 to 45 dyn/cm, more preferably 25 to 40 dyn/cm.

Furthermore, the aqueous ink composition of the invention is preferably used as an ink for ink jet recording.

Next, preparation examples of emulsions of the sulfonyl group-containing (co)polymers to be used in the preparation of the aqueous ink compositions of the invention are described below, but the invention is not limited thereto.

Emulsion 1

(1) Into a glass-made reaction vessel was placed 100 g of dioxane, and 11.8 g of sulfuric anhydride was added thereto while the inner temperature was maintained at 25° C. After 2 hours of stirring, a sulfuric anhydride-dioxane complex was obtained.

(2) Into a THF solution (concentration=15%) of 100 g of styrene/isoprene/styrene triblock copolymer (ratio by weight=10/80/10, Mw—100,000) was added all the amount of the complex obtained in (1) while the inner temperature was maintained at 25° C. The stirring was continued for further 2 hours.

(3) Into a flask were placed 1,200 g of water, 7.1 g of sodium hydroxide, and 1 g of sodium dodecylbenzenesulfonate, and the inner temperature was maintained at 40° C. All the amount of the solution obtained in (2) was added dropwise thereinto over a period of 1 hour while the inner temperature was maintained at 40° C. After the addition, the whole was stirred at 40° C. for 2 hours and the solvent was removed by distillation under reduced pressure while the water was left to obtain a sulfonated polymer emulsion having a concentration of 15%. The particle diameter of the polymer was 30 nm and the content of sulfonic acid in the solid mass was 1.2 mmol/g.

Emulsion 2

(1) Into a glass-made reaction vessel was placed 100 g of 1,2-dichloroethane, and 11.8 g of sulfuric anhydride was added thereto while the inner temperature was maintained at 25° C., whereby a 1,2-dichloroethane solution of sulfuric anhydride was obtained.

(2) Into a 1,2-dichloroethane solution (concentration=15%) of 100 g of hydrogenation product (hydrogenation rate 99%) of the diene units of butadiene/styrene/butadiene copolymer (ratio by weight=30/40/30, Mw=50,000) was added all the amount of the sulfuric anhydride solution obtained in above (1) over a period of 1 hour while the inner temperature was maintained at 25° C. The stirring was continued for further 2 hours. After stirring, about 500 g of 1,2-dichloroethane was removed under reduced pressure and then 500 g of THF was added thereto.

(3) Into a flask were placed 1,200 g of water, 7.1 g of sodium hydroxide, and 1 g of sodium dodecylbenzenesulfonate, and the inner temperature was maintained at 40° C. All the amount of the solution obtained in (2) was added dropwise thereinto over a period of 1 hour while the inner temperature was maintained at 40° C. After the addition, the whole was stirred at 40° C. for 2 hours and the solvent was removed by distillation under reduced pressure while the water was left to obtain a sulfonated polymer emulsion having a concentration of 15%. The particle diameter of the polymer was 40 nm and the content of sulfonic acid in the solid mass was 1.0 mmol/g.

Emulsion 3

To a 500 ml round-bottomed four-necked flask were added 0.75 g of Emal O (an alkyl sulfate-type anionic emulsifying agent) and 155 g of distilled water. After replacement by nitrogen gas under slow stirring, 20 g of a mixed monomer composed of 40 g of vinylsulfonic acid and 40 g of methacrylic acid was added thereto. The bath temperature was maintained at 30° C., and after about 20 minutes, one tenth of 10 ml of an aqueous solution containing 0.75 g of potassium persulfate and 10 ml of an aqueous solution containing 0.75 g of acid sodium bisulfite. After 30 minutes, 60 g of the remaining mixed monomer was added dropwise over a period of 3 hours and the polymerization initiators were also added portionwise before the completion of the addition of the monomer. After the addition, the stirring was continued for 1 hour, and the mixture was salted out by ½ mol of aqueous sodium sulfate solution, washed, and then dried.

The resulting copolymer was dissolved in toluene. Thereafter, the toluene solution was stirred and mixed with water to emulsify the copolymer and the toluene was removed while the water was left, whereby Emulsion 3 was obtained.

EXAMPLES

The present invention will be illustrated in greater detail with reference to the following Examples, but the invention should not be construed as being limited thereto.

Example 1

Ink Sett A

Pigment Dispersion A:

| Pigment Yellow 120 | 25% by weight |
|---|---|
| Styrene acrylic acid copolymer (a dispersant resin) (acid value: 120) | 5% by weight |

Pigment Yellow 128 and the dispersant resin were mixed and the concentration of the dispersed pigment is regulated to be 25% by adding pure water to obtain a mixture. The mixture was dispersed together with glass beads (diameter: 1.7 mm, an amount of 1.5 times the weight of the mixture) for 2 hours in a sand mill manufactured by Yasukawa Seisakusyo K.K. After the dispersing, glass beads were removed to obtain Pigment Dispersion A.

Yellow Ink Composition A:

The following components were mixed and stirred at ambient temperature for 20 minutes, and then the mixture was filtrated through an 8 μmK/membrane filter to obtain Yellow Ink Composition A.

| Pigment Dispersion A | 12.5% by weight |
|---|---|
| Emulsion 1 | 6.7% by weight |
| Glycerin | 10% by weight |
| Surfynol 104 | 1% by weight |
| Triethylene glycol monobutyl ether | 5% by weight |
| Pure water | remainder |

Magenta Ink Composition A:

Magenta Ink Composition A was obtained in a similar manner to the preparation of Yellow Ink Composition A with the exception that Pigment Red 122 was employed as the pigment instead of Pigment Yellow 128.

Cyan Ink Composition A:

Cyan Ink Composition A was obtained in a similar manner to the preparation of Yellow Ink Composition A with the exception that Pigment Blue 15:3 was employed as the pigment instead of Pigment Yellow 128.

Example 2

Ink Set B

Ink Set B (Yellow Ink Composition D, Magenta Ink Composition H, and Cyan Ink Composition B) was obtained in a similar manner to the preparation of Ink Set A with the exception that Emulsion 2 was employed instead of Emulsion 1 and that Surfynol TG was employed instead of Surfynol 104.

Example 3

Ink Set C

Ink Set C (Yellow Ink Composition C, Magenta Ink Composition C, and Cyan Ink Composition C) was obtained in a similar manner to the preparation of ink Set A with the exception that Emulsion 3 was employed instead of Emulsion 1.

Example 4

Ink Set D

Ink Set D (Yellow Ink Composition D, Magenta Ink Composition D, and Cyan Ink Composition D) was obtained in a similar manner to the preparation of Ink Set A with the exception that Pigment Dispersion A was replaced with Pigment Dispersion B, obtained by using styrene-acrylic acid copolymer (a dispersant resin) (acid value: 90) instead of styrene-acrylic acid copolymer (a dispersant resin) (acid value: 120) in Pigment Dispersion A.

Example 5

Ink Set E

Ink Set E (Yellow Ink Composition E, Magenta Ink Composition E, and Cyan Ink Composition E) was obtained in a similar manner to the preparation of Ink Set A with the exception that Pigment Dispersion A was replaced with Pigment Dispersion C, obtained by using styrene-acrylic acid copolymer (a dispersant resin) (acid value: 100) instead of styrene-acrylic acid copolymer (a dispersant resin) (acid value: 120) in Pigment Dispersion A.

Comparative Example 1

Ink Set F

Ink Set F (Yellow Ink Composition F, Magenta Ink Composition F, and Cyan Ink Composition F) was obtained in a similar manner to the preparation of Ink Set A with the exception that Emulsion 1 was not added.

The following evaluation tests were conducted on each aqueous ink composition obtained in Examples and Comparative Example. The results obtained are shown in Table 1.

Evaluation of Cohesion Differential:

The aqueous ink compositions of above Ink Set A to F were each loaded on an ink jet recording apparatus MC-2000 manufactured by Seiko Epson Corporation, and printing was conducted on MC photographic paper manufactured by Seiko Epson Corporation with the combination of yellow and magenta or yellow and cyan at the same print duty for each ink composition. The resulting prints were evaluated in accordance with the following criteria.

A: No cohesion differential occurred even when total of print duty of each ink composition was 140%.

B: Cohesion differential occurred when total of print duty of each ink composition was 120% or more.

C: Cohesion differential occurred when total of print duty of each ink composition was 100% or more.

Evaluation of Gloss Differential:

Magenta ink compositions A to F were each loaded on an ink jet recording apparatus MC-2000, and a color patch was printed on MC photographic paper at a print duty of 10%, 20%, 40%, 60%, 80%, or 100%. The samples were observed visually from various angles and evaluated in accordance with the following criteria.

A: The difference of gloss was hardly noticeable even between different print duties.

B: The difference of gloss was observed but was not so remarkable between different print duties.

C: The difference of gloss was noticeable between different print duties.

Evaluation of Glossiness:

Aqueous ink compositions or ink Sets A to F were each loaded on an ink jet recording apparatus MC-2000, and printing was conducted on PM photographic paper manufactured by Seiko Epson Corporation. Relative-specular glossiness at 60° was measured by means of a glossmeter PG-1M manufactured by Nihon Densyoku Kogyo K.K. and evaluation was conducted in accordance with the following criteria.

A: Glossiness was 90 or more.
R: Glossiness was from 80 to less than 90.
C: Glossiness was less than 80.

Evaluation of Bronzing:

Cyan ink compositions A to F were each loaded on an ink jet recording apparatus MC-2000, and a color patch was printed on MC photographic paper at a print duty of 10%, 20%, 40%, 60%, 80%, or 100%. The samples were observed visually from various angles and evaluated in accordance with the following criteria.

A: Reddish coloring was not observed or was hardly noticeable at all the print duties.
B: Reddish coloring was observed at one or two print duties.
C: Reddish coloring was observed at three or more print duties.

Evaluation of Fixing Ability:

Aqueous ink compositions of Ink Sets A to F were each loaded on an ink jet recording apparatus MC-2000, and printing was conducted on MC glossy paper. The printed part was strongly rubbed with a finger at 30 minutes after the printing, and evaluation was conducted in accordance with the following criteria.

A: No staining occurred.
B: Staining slightly occurred
C: Staining occurred.

Evaluation of Ejection Stability:

Aqueous ink compositions of Ink Sets A to F were each loaded on an ink jet recording apparatus MC-2000, and 500 sheets of a pattern comprising text and graphics as A4 size were printed. Cleaning was conducted at the time when any missing or bend occurred, and evaluation was conducted based on the number of cleaning times required during 500 sheets of printing in accordance with the following criteria.

A: The number of cleaning times was 1 time or less.
B: The number of cleaning times was from 2 to 4 times.
C: The number of cleaning times was 5 times or more.

In particular, the use of a pigment dispersed or dissolved in an aqueous medium by the action of an acrylic (co)polymer having an acid value of 100 or more or a combination of the acrylic (co)polymer and other dispersant as the polymeric dispersant further serves an excellent effect that a highly glossy recording is possible.

While the invention has been described in detail and with reference to specific examples thereof, it will be apparent, to one skilled in the art that various changes and modifications can be made therein without departing from the spirit and scope thereof.

What is claimed is:

1. An aqueous ink composition comprising at least water, a pigment dispersed by polymer, a sulfonyl group-containing (co) polymer, and an ultra-penetrating agent, wherein the sulfonyl group-containing (co) polymer is present in the form of an emulsion, and wherein the ultra-penetrating agent is a combination of a compound represented by the following formula (1) and triethylene glycol monobutyl ether:

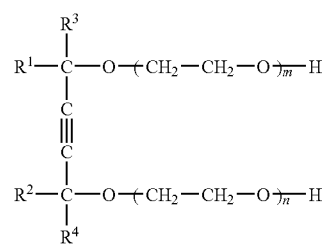

(1)

wherein $0 \leq m+n \leq 50$, and $R^1$, $R^2$, $R^3$ and $R^4$ each independently is an alkyl group.

2. The aqueous ink composition according to claim 1, wherein the sulfonyl group-containing (co) polymer is at least one of a diene-based, sulfonyl group-containing (co) polymer and a non-diene-based, sulfonyl group containing (co) polymer.

3. The aqueous ink composition according to claim 1, wherein the sulfonyl group-containing (co)polymer has a particle diameter of from 30 to 40 nm.

TABLE 1

| | Example 1 Ink Set A | Example 2 Ink Set B | Example 3 Ink Set C | Example 4 Ink Set D | Example 5 Ink Set E | Comparative Example 1 Ink Set F |
|---|---|---|---|---|---|---|
| Cohesion differential | A | A | A | A | A | B |
| Gloss differential | A | A | A | A | A | C |
| Glossiness | A | A | A | B | A | C |
| Bronzing | A | A | A | A | A | B |
| Fixing ability | A | A | A | A | A | C |
| Ejection stability | A | A | A | A | A | A |

As described in detail above, the invention provides a pigment-containing aqueous ink composition excellent in light-fastness and water-fastness wherein a polymeric dispersant is employed as the pigment and a sulfonyl group-containing (co)polymer and an ultra-penetrating agent are contained, whereby there are exhibited excellent effects that cohesion differential, bronzing phenomenon, color-bleeding, and the like are not occurred, and improved fixing ability and coloring property are realized without impairing ejection stability.

4. The aqueous ink composition according to claim 1, wherein the sulfonyl group-containing (co)polymer is present in the aqueous ink composition in an amount from 0.2 to 10% by weight.

5. The aqueous ink composition according to claim 1, wherein the triethylene glycol monobutyl ether is present in the ink composition in an amount of from 1 to 10% by weight.

* * * * *